May 6, 1958     F. D. O'NEILL     2,832,980
CLEANING DEVICE
Filed Oct. 5, 1956     2 Sheets-Sheet 1
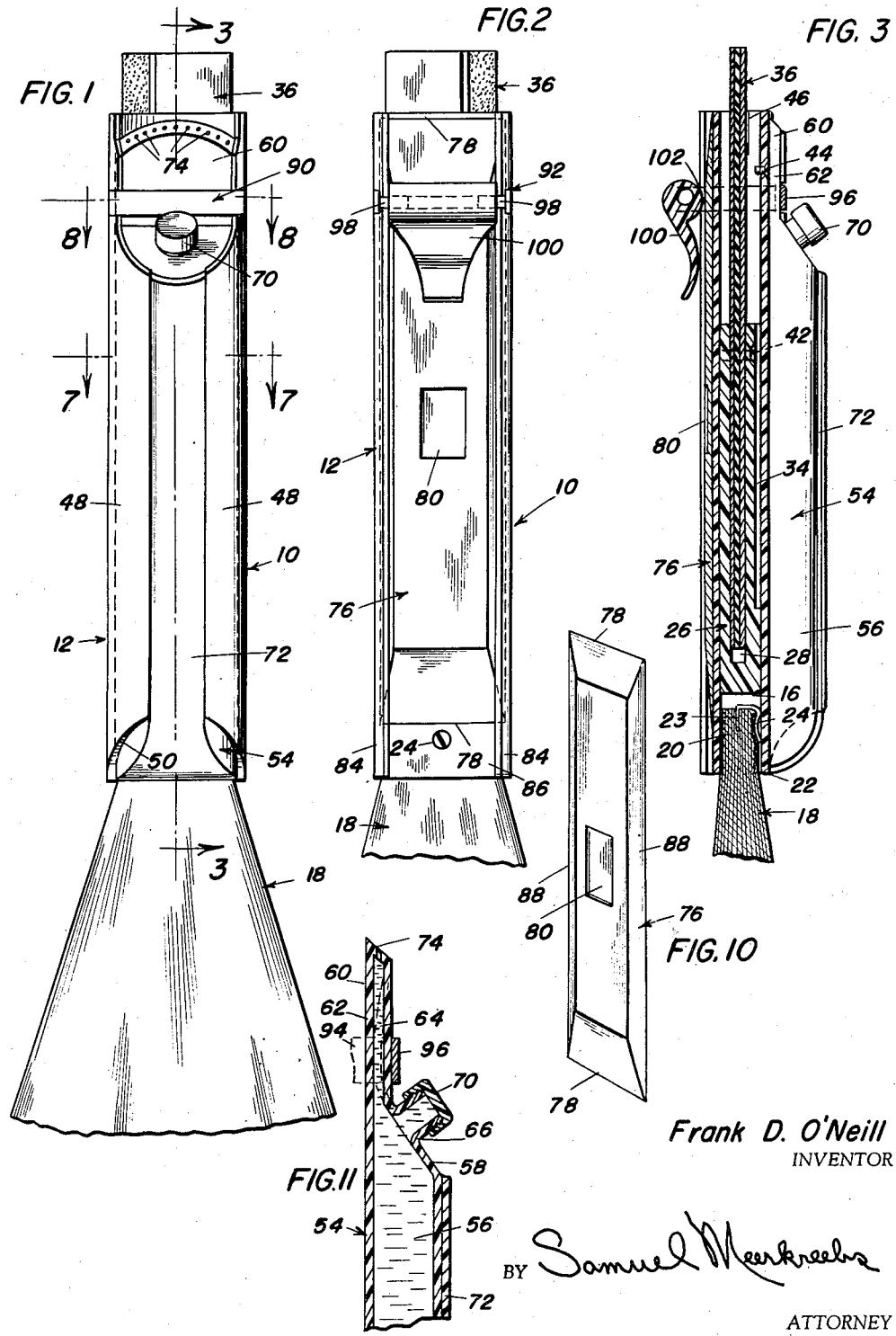
Frank D. O'Neill
INVENTOR
BY Samuel Meerkreebs
ATTORNEY May 6, 1958 F. D. O'NEILL 2,832,980
CLEANING DEVICE
Filed Oct. 5, 1956 2 Sheets-Sheet 2
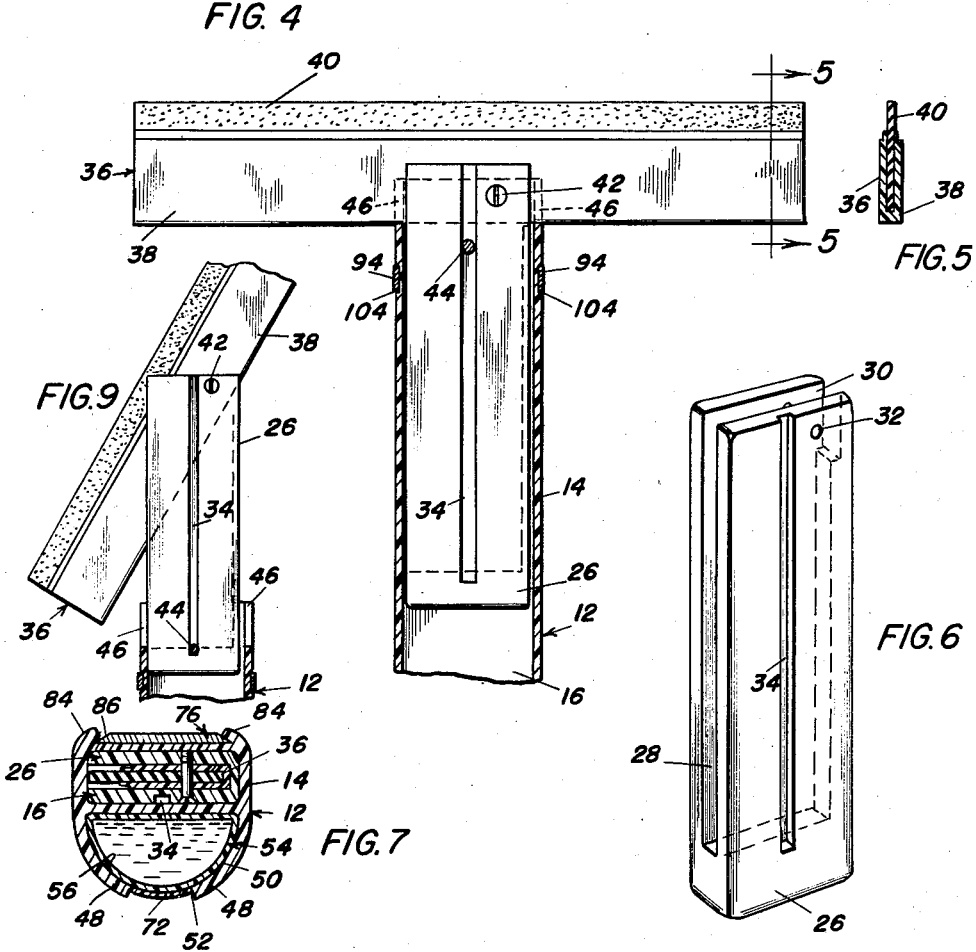
Frank D. O'Neill
INVENTOR
BY Samuel Meerkreebs
ATTORNEY

United States Patent Office

2,832,980
Patented May 6, 1958

2,832,980

CLEANING DEVICE

Frank D. O'Neill, Toronto, Ontario, Canada

Application October 5, 1956, Serial No. 614,179

5 Claims. (Cl. 15—124)

This invention relates in general to new and useful improvements in cleaning devices, and more specifically to a new and novel cleaning device which is specifically intended to be used in conjunction with automotive vehicles.

In order to maintain an automobile in condition for use at all times and also keep such automobile clean, there is normally necessary for the average motorist to keep on hand a suitable cleaning device for cleaning the windows when dirty, a scraper for scraping ice and snow off of the windows, particularly the windshield, and a suitable brush, or broom for cleaning out the interior of the vehicle. It is therefore, the primary object of this invention to provide a combination cleaning device which utilizes a single handle to support a squeegee like cleaning element, a cleaning agent dispenser, a scraper and a whisk broom or brush.

Another object of this invention is to provide an improved cleaning device which includes an elongated handle of a size to be readily received in one's hand, the handle having carried thereby a squeegee or blade type cleaning element, the cleaning element being so mounted on the handle whereby it may be selectively positioned either transversely on the handle in an operative position or longitudinally of the handle within the handle in an inoperative position.

Another object of this invention is to provide an improved cleaning device of the type which includes a generally tubular handle having selectively received therein a squeegee type cleaning element, there being carried by the exterior of the handle a cleaning agent dispenser, the dispenser having a spray head directed generally with the cleaning element when the cleaning element is in an operative position whereby by a simple manipulation of the cleaning device windows and the windshield of the vehicle may be first sprayed with the necessary cleaning agent and then wiped clean with the cleaning element.

A further object of this invention is to provide an improved cleaning device for use in conjunction with automobiles, the cleaning device being a combined article and including a cleaning agent dispenser, a cleaning element, and a whisk broom or brush and a scraper, all of the elements being formed of relatively inexpensive material and being so constructed whereby the cost of manufacture is relatively cheap so that the cleaning device is economically feasible.

A still further object of this invention is to provide an improved cleaning device which includes a handle having projected from one end thereof a whisk broom or brush and from the opposite end thereof a cleaning element, there being carried by opposite faces of the handle a cleaning agent dispenser and a scraper, there also being carried by the handle a clamp for selectively retaining the scraper in a juxtaposition and rendering the cleaning agent dispenser inoperative.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the cleaning device, which is the subject of this invention, and shows the same in a collapsed state ready for either storage or for use of the whisk broom or brush;

Figure 2 is an elevational view of the opposite side of the cleaning device and shows the general details of a scraper slidably carried thereby, a lower portion of the whisk broom being omitted;

Figure 3 is a fragmentary vertical sectional view taken substantially upon the plane indicated by the section line 3—3 of Figure 1 and shows the specific details of both the mounting of the cleaning element for sliding movement relative to the handle of the cleaning device and the relationship of the clamp for rendering the cleaning agent dispenser inoperative and retaining the scraper in a selected position;

Figure 4 is a fragmentary vertical sectional view taken through the upper portion of the cleaning device at right angles to the view of Figure 3 and shows by dotted lines the cleaning element in an inoperative position within the handle, and by solid lines the operative position transversely of the handle at the upper end thereof;

Figure 5 is a transverse sectional view taken substantially upon the plane indicated by section line 5—5 of Figure 4 and shows the details of construction of the cleaning element;

Figure 6 is an enlarged perspective view of the mounting block for the cleaning element and shows the specific details thereof;

Figure 7 is a transverse horizontal sectional view taken substantially upon the plane indicated by the section line 7—7 of Figure 1 and shows the specific mounting of both the scraper and the cleaning agent dispenser;

Figure 8 is a transverse horizontal sectional view taken substantially upon the plane indicated by the section line 8—8 of Figure 1 and shows specific details of the clamp and the relationship thereof with respect to both the cleaning agent dispenser and the scraper;

Figure 9 is a fragmentary sectional view similar to Figure 4, but on a reduced scale and showing the cleaning element in an intermediate stage between its operative position and its inoperative position;

Figure 10 is a perspective view of the scraper; and

Figure 11 is an enlarged fragmentary vertical sectional view taken through the upper part of the cleaning agent dispenser and shows the specific details thereof.

Referring now to the drawings in detail, it will be seen that the cleaning device, which is the subject of this invention, is referred to in general by the reference numeral 10. The cleaning device 10 includes an elongated handle which is referred to in general by the reference numeral 12. The handle has a main portion which is generally rectangular in cross-section, the main portion being referred to by reference numeral 14 and having a longitudinal, generally rectangular opening 16 therethrough which opens through opposite ends of the handle 12.

The cleaning device 10 incorporates a removable whisk broom or brush assembly 18. The assembly 18 includes suitable bristles and an upper portion 20 bound together by a suitable binding 22. A spring clip has a leg 23 extending into the upper portion 20 of the brush, continuing as a lateral extension terminating in a resilient leg 24, see Figure 3, the portion 20 being removably received in opening 16 of the the handle.

The cleaning device 10 includes a mounting block 26, see Figure 6, the mounting block 26 being of a size to be snugly received within the opening 16 for sliding movement therethrough. The mounting block 26 is elongated and is provided with an elongated longitudinal recess 28 opening through one side edge and the top thereof. The recess 28 forms a seat to be described in more detail hereinafter. The upper end of the mounting block 26 is provided with a transverse recess 30 which intersects the recess 28 and opens through both the side edges of the mounting block 26 and the upper end thereof. The recess 30 also forms a seat to be described in more detail. Extending transversely through the upper part of the mounting block 26 in offset relation to the center thereof is a transverse bore 32. Extending longitudinally substantially the full length of the mounting block 26 in one face thereof and opening through the upper end thereof is an elongated longitudinal slot 34.

The cleaning device 10 also includes a squeegee or blade type cleaning element which is referred to in general by the reference numeral 36, including a base portion 38 and a wiper portion 40, see Figure 5.

Referring now to Figure 4 in particular, it will be seen that there is provided a transverse pivot pin 42 which extends through the bore 32 and through the base portion 38 of the cleaning element 36, the pivot pin 42 functioning as a pivot for the cleaning element 36 and having a head thereof countersunk in one end of the bore 32 and the opposite end thereof threadedly engaged in the opposite end of the bore 32, see Figure 7.

When the cleaning element 36 is in an operative position, it will be disposed transversely of the mounting block 26 and seated in the seat formed by the recess 30, see Figure 4. On the other hand, when the cleaning element 36 is in an inoperative position, as best illustrated in Figures 3 and 7, it will be disposed longitudinally of the mounting block 26 and disposed in the seat formed by the recess 28. It is to be noted that the cleaning element 36 is so mounted with respect to the mounting block 26, that when it is seated in the recess 28 the cleaning element 36 may be slid down into the opening 16 in the handle 12 together with the mounting block 26. The downward movement of the mounting block 26 and the cleaning element 36 is limited by the upper portion 20 of the brush 18.

In order to prevent the removal of the mounting block 26 from the handle 12, there is carried by the upper part of the handle 12 a retaining pin 44 which projects into the opening 16 being received in the slot 34. When the mounting block 26 is pulled out of the handle 12, the pin 44 will seat in the lower end of the slot 34 and limit such outward movement of the mounting block 26 to the position illustrated in Figure 9.

It is to be noted that the upper end of the handle 12 is provided with a pair of transverse notches 46. The notches 46 provide clearance for the cleaning element 36 when it is being swung from an inoperative position to an operative position and vice versa, as is best illustrated in Figure 9 and also function as seats for the cleaning element 36 when in an operative position, such as that illustrated in Figure 4. It is to be noted that when the cleaning element 36 is in an operative position, the notches 46 are aligned with the recesses 30 so that the seats formed thereby are in alignment.

Referring now to Figure 7 in particular, it will be seen that the main portion 14 of the handle 12 is provided at one side with curved extensions 48 which form a longitudinal pocket 50 at one side of the handle 12, the pocket 50 having the opposite ends thereof open and including a longitudinal opening 52 between the spaced ends of the extensions 48. Seated in the pocket 50 is a cleaning agent dispenser which is referred to in general by the reference numeral 54.

The cleaning agent dispenser 54 includes primarily an elongated flexible container 56 having a closed lower end and an upwardly sloping top wall 58 terminating in a generally fan shaped spray head 60. The spray head 60 is connected to the top wall 58 by means of relatively flat intermediate portions 62 having a narrow outlet opening 64 for conducting liquid to the spray head 60 from the container 56. The sloping top wall 58 is provided with a suitable filler neck 66 having a closure cap 70.

Extending longitudinally of the container 56 is a projecting strip 72 which extends through the opening 52. The projecting strip 72 is selectively engaged by one's finger to compress the container 56 and dispense cleaning liquids from the spray head 60. The spray head 60 is provided with suitable spray openings 74 arranged in such a manner to effect a fan shaped spray. It is to be noted that the spray openings 74 are generally aligned with the cleaning element 36 when it is in operative position so that one using the cleaning device 10 may readily spray the cleaning agent on a window or windshield and then immediately wipe it off using the cleaning element 36 so as to greatly facilitate the window cleaning process.

Referring now to Figure 10 in particular, it will be sees that there is illustrated a scraper which is referred to in general by the reference numeral 76. The scraper 76 is generally rectangular in cross-section and is rectangular in outline. Provided in opposite ends of the scraper 76 are blades 78 which may be selectively used by reversing the scraper 76. The scraper 76 also includes a suitable milled recess or slot 80 therein finger engageable for extension and retraction of the scraper in the handle.

The main portion 14 of the handle 12 is provided with slightly curved extensions 84 along the edge thereof remote from the extensions 48, see Figure 7, the extensions 84 extending longitudinally of the handle 12 and forming a second pocket 86. It is to be noted that the side edges of the scraper 76 are beveled as at 88 to be received under the extensions 84 and to retain the scraper 76 in the pocket 86 by longitudinal sliding movement only. By using the slot 80, the scraper may be slid so that it extends beyond the upper end of the handle 12 and the cleaning element 36 and one of the blades 78 thereof may be used for the purpose of scraping ice and snow from the windows and windshield of the vehicle.

The cleaning device 10 also includes a clamp which is referred to in general by the reference numeral 90. The clamp 90 includes a generally U-shaped clamp element 92 having legs 94 connected together by bight portion 96. The legs 94 carry at the ends thereof remote from the bight portion 96 opposed pins 98 on which there is mounted for rotation an actuator 100 having a cam surface 102.

The clamp 90 is retained on the handle 12 by the positioning of the legs 94 in slots 104 in the edges of the main portion 14, as is best illustrated in Figure 4. The clamp 90 is so positioned whereby the bight portion 96 encircles the portion 62 of the cleaning agent dispenser 54 and the cam surface 102 is disposed in alignment with the scraper 76. Thus when the clamp 90 is actuated, it will both clamp the scraper 76 in an adjusted position and will so collapse the opening 64 in the portion 62 so as to render the cleaning agent dispenser 54 inoperative.

It is to be understood that substantially all of the elements of the cleaning device 10 may be economically formed of plastic material with the exception of certain of the fasteners and certain parts of the clamp 90. The various components may be formed by suitable molding processes and the like so that they may be mass produced. Inasmuch as the connections between the various components are relatively simple, the assembly of the cleaning device can be very simple and economically feasible. It will be noted that the brush assembly may be removed and used separately from the other portion of the device, and the cleaning element 36 may be used when the block 26 is extended out of the handle 12 thus affording an increased handle length as well as permitting the cleaning element to be utilized in an angularly disposed position on pivot pin 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cleaning device comprising an elongated handle having a central longitudinal opening, a mounting block slidably positioned in said central opening, a blade type cleaning element removably positioned in said central opening for movement out of one end of said handle, and means pivotally connecting said cleaning element to said mounting block whereby said cleaning element is selectively retained by said mounting block in an inoperative position within said handle and a transverse operative position at said one end, means on said mounting block and said handle for limiting movement of said mounting block and said cleaning element relative to said handle, said last mentioned means including a brush positioned in said opening at the other end of said handle and projecting therefrom, said brush being engageable with said mounting block to limit movement of said mounting block in said handle.

2. A cleaning device comprising an elongated handle having a central longitudinal opening, a mounting block slidably positioned in said central opening, a blade type cleaning element removably positioned in said central opening for movement out of one end of said handle, and means pivotally connecting said cleaning element to said mounting block whereby said cleaning element is selectively retained by said mounting block in an inoperative position within said handle and a transverse operative position at said one end, a longitudinal pocket in an exterior face of said handle, a cleaning agent dispenser seated in said pocket, said cleaning agent dispenser including a spray head adjacent said cleaning element when said cleaning element is in said operative position.

3. A cleaning device as set forth in claim 2 wherein said cleaning agent dispenser includes a collapsible portion adjacent said spray head, a releasable clamp carried by said handle in engagement with said collapsible portion for rendering said cleaning agent dispenser inoperative.

4. A cleaning device as set forth in claim 3 including a second longitudinal pocket in a second exterior face of said handle, said second pocket having an open end at said one end of said handle, a scraper slidibly mounted in said second pocket for movement out of said open end, said clamp including a cam actuator engaging said scraper and retaining said scraper in a selected position.

5. A cleaning device comprising an elongated handle having a central longitudinal opening, a mounting block slidably positioned in said central opening, a blade type cleaning element removably positioned in said central opening for movement out of one end of said handle, and means pivotally connecting said cleaning element to said mounting block whereby said cleaning element is selectively retained by said mounting block in an inoperative position within said handle and a transverse operative position at said one end, a longitudinal pocket in an exterior face of said handle, said pocket having an open end at said one end of said handle, a scraper slidably mounted in said pocket for movement out of said open end, and clamp means carried by said handle retaining said scraper in a selected position.

References Cited in the file of this patent

UNITED STATES PATENTS

| | | |
|---|---|---|
| 2,242,900 | Bender | May 20, 1941 |
| 2,454,374 | Bowlin | Nov. 23, 1948 |
| 2,707,292 | Lustbader | May 3, 1955 |